United States Patent

[11] 3,614,345

| [72] | Inventor | Frederic R. Quinn<br>Red Hook, N.Y. |
|---|---|---|
| [21] | Appl. No. | 877,379 |
| [22] | Filed | Nov. 17, 1969 |
| [45] | Patented | Oct. 19, 1971 |
| [73] | Assignee | Zyrotron Industries, Inc.<br>Hackensack, N.J. |

[54] THERMAL SENSING DEVICE
13 Claims, 7 Drawing Figs.

[52] U.S. Cl............................................. 200/2,
219/210, 337/107, 338/22, 338/23
[51] Int. Cl........................................ H01h 9/54
[50] Field of Search........................................ 200/2;
337/107; 338/22 A, 23 L, 24 L, 22 R, 22 SD, 23,
24; 219/210

[56] References Cited
UNITED STATES PATENTS

| 2,815,423 | 12/1957 | Polye............................ | 338/23 |
| 3,022,446 | 2/1962 | Irish, Jr....................... | 338/22 X |
| 3,209,104 | 9/1965 | Malone......................... | 337/107 X |
| 3,264,448 | 8/1966 | Lehmer......................... | 219/210 |
| 3,305,000 | 2/1967 | Bullen et al.................. | 219/210 UX |
| 3,444,399 | 5/1969 | Jones............................ | 338/22 X |

*Primary Examiner*—J. R. Scott
*Attorney*—Irving Seidman

ABSTRACT: The device is adapted to be used with an external circuit for controlling the operation of associated equipment and comprises sensing means the impedance of which varies in proportion to the ambient temperature. The sensing means is provided with leads to connect the same to the control circuit. In energy exchanging relationship with the sensing means is the heat producing portion of a heater; said heater having terminals for connection to the associated equipment so that the temperature of the heater varies in proportion to a parameter of the associated equipment. An enclosure receives the heat producing portion of the heater and the sensing means therein to concentrate the heat generated by the heater. Additionally, a housing surrounds the enclosure to insulate the enclosure from the external temperature.

PATENTED OCT 19 1971 3,614,345
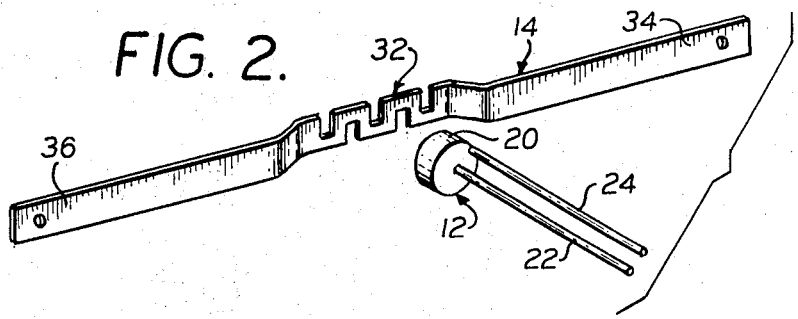
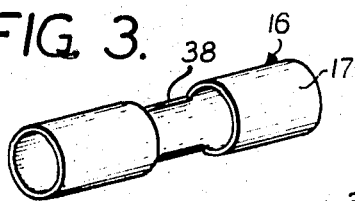
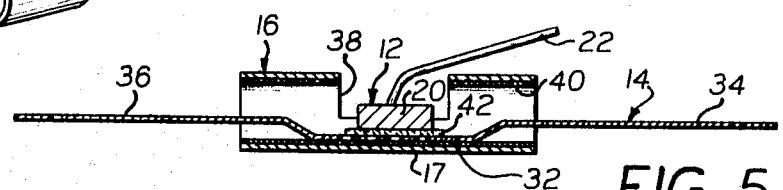
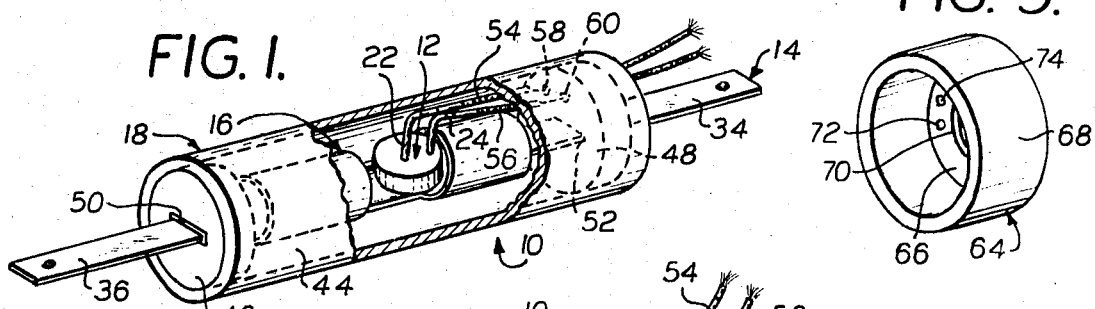
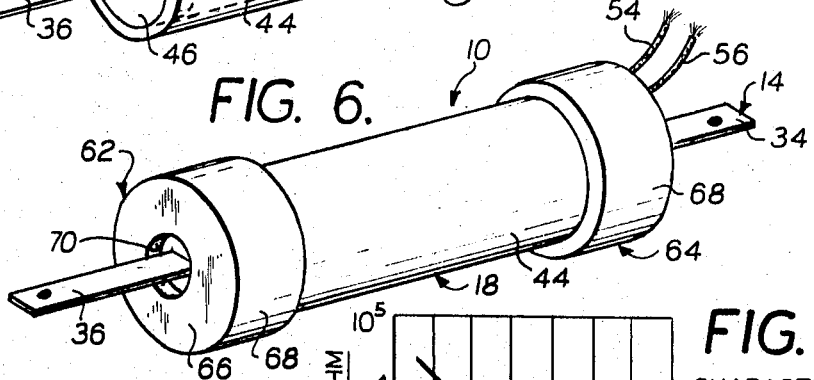
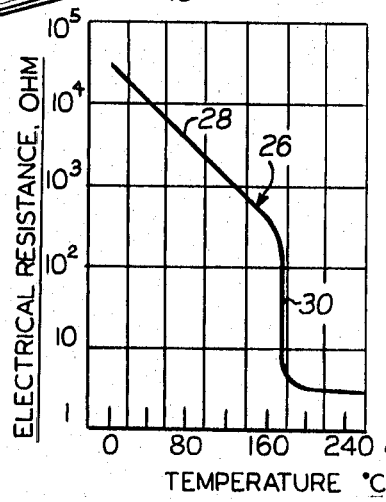
FIG. 7.
CHARACTERISTIC FOR SENSOR 12
INVENTOR
FREDERIC R. QUINN
BY
Irving Seidman
ATTORNEY.

THERMAL SENSING DEVICE

This invention relates generally to a thermal sensing device and, more particularly, pertains to a thermal sensor which is substantially insulated from external temperature variations to provide an efficient and accurate device.

Thermal sensing devices are usually used as a safety device to control the operation of associated equipment. For example, such devices are operable to actuate a control circuit which causes power to be removed from equipment when a parameter such as the current of the equipment reaches a preselected danger point. Normally, the sensing devices include a sensing element or sensor, the impedance of which changes in proportion to the ambient temperature. The current values of the associated equipment being monitored are converted to proportional temperatures by means of a heater. The sensor senses the temperature of the heater and actuates the control circuit when the sensed temperature reaches a value corresponding to the danger point of the equipment current. However, presently commercially available sensing devices suffer from a number of drawbacks.

Thus, the heaters and the sensors in such devices usually are exposed to the surroundings. Hence, they are subject to ambient temperature variations which produces inaccurate results. To be more specific, if the ambient temperature is relatively high the sensing device will operate the external control circuit in a shorter period of time than when the ambient temperature is relatively low. Additionally, present sensing devices utilize a sensor whose impedance changes at a relatively gradual rate with temperature. As a result, it is difficult to design a control circuit which operates when the temperature reaches one preselected value. In the more usual case, the control circuit is designed to operate when the temperature of the sensor falls into a wide range of temperatures. Thus, such devices are highly inaccurate since it is difficult to specify the particular temperature at which the control circuit will be actuated. Additionally, these sensors are usually slow acting so that serious damage may occur before the control circuit is actuated.

Accordingly, an object of the present invention is to provide an improved sensing device.

A more specific object of this invention is to provide a highly efficient sensing device.

Another object of the present invention resides in the novel details of construction which provide a sensing device of the type described which is substantially insulated from the surrounding temperature variations.

Accordingly, a sensing device constructed according to the present invention comprises sensing means having an impedance which varies in accordance to its temperature. Temperature varying means is provided for varying the temperature of the sensing means. The temperature varying means has means for connecting the temperature varying means with an external device to be monitored so that the temperature of the temperature varying means varies in accordance with a selected parameter of the external device. An enclosure receives the temperature varying means and the sensing means therein with the temperature varying means in energy exchanging relationship with the sensing means to insulate the same from the surroundings. The sensing means is provided with lead means for connecting the sensing means to a control circuit.

As noted above, it is highly desirable to have a sensing device operate the control circuit when the sensor reaches a preselected temperature or is within a narrow range of temperatures rather than a wide range of temperatures. Accordingly, a further object of the invention is the provision of a sensing device having a sensor, the impedance of which changes abruptly at a preselected temperature to provide a highly accurate and fast-acting device.

Other features and advantages of the present invention will become more apparent from a consideration of the following detailed description when taken in conjunction with the accompanying drawings, in which:

FIG. 1 is a perspective view, with parts broken away and the end caps removed, of a thermal sensing device constructed according to the present invention;

FIG. 2 is an exploded view of the sensor and heater components of the sensing device of FIG. 1;

FIG. 3 is a perspective view of the enclosure thereof;

FIG. 4 is a vertical sectional view of the sensing device with the outer jacket removed in the interest of clarity;

FIG. 5 is a perspective view of an end cap;

FIG. 6 is a perspective view of the sensing device constructed in accordance with the present invention; and FIG. 7 is a graph illustrating the characteristics of a sensor which may be used in the construction of the present invention.

Accordingly, a thermal sensing device constructed according to the present invention is designed generally by the reference numeral 10 in the FIGS. and comprises a sensor 12, a heater 14 in energy exchanging relationship with the sensor 12, an enclosure 16 which receives the sensor 12 and the heater 14, and an insulating jacket 18 which surrounds the enclosure and insulates the same, both electrically and thermally, from its surroundings.

More specifically, the sensor or sensing means 12 includes a pellet 20 of material, the resistance or impedance of which varies in accordance with its temperature. A lead 22 is connected to the center of the pellet 20 and another lead 24 is connected to the pellet 20 adjacent to its periphery. The leads 22 and 24 are adapted to be connected to a control circuit so that the resistance of the pellet 20 appears between the leads 22 and 24. The control circuit (not shown) may be of conventional design so that when the resistance of the pellet reaches a predetermined value the control circuit will be actuated.

While any material the resistance of which varies with temperature may be used as the pellet 20, in practice the sensor 12 may comprise any type of well known thermal sensor.

The characteristic curve 26 for a sensor of the type described above is shown in the resistance versus temperature graph of FIG. 7 and includes a gradually sloping portion 28. However, when the temperature of the sensor 12 reaches a preselected value (about 178° C. in the illustrated example), there is an abrupt discontinuity in the curve 26 and the resistance of the sensor 12 changes at a very rapid rate as indicated by the substantially vertical line portion 30 of the curve. Thus, by utilizing a sensor of this type, the abrupt change in resistance at the temperature under consideration ensures that the control circuit will operate when the sensor reaches the so-called triggering temperature to provide a highly reliable and accurate device. Moreover, this drop in impedance is extremely rapid and occurs within 3–4 seconds as opposed to other types of sensors wherein the impedance change takes substantially longer.

The heater 14 comprises a strip of material having a relatively high resistance. More particularly, the heater 14 includes a heat producing portion 32 having portions cut away to decrease the cross-sectional area thereof. Hence, the heat dissipation in this portion is increased. Extending upwardly and outwardly in opposed directions from the portion 32 are respective terminal portions 34 and 36. The terminals 34 and 36 are adapted to be connected with the equipment to be monitored so that the heater responds to a parameter of the equipment.

To be more specific, the heater 14 may be connected so that the current of the equipment to be protected flows through the heater. If an overload occurs, the current increases and the temperature of the portion 32 of the heater likewise increases. The characteristics of the heater 14 are chosen so that when the current reaches a dangerous or unsafe value, the temperature of portion 32 reaches the triggering temperature which causes the resistance of the sensor 12 to change abruptly and actuate the control circuit which, in turn, may operate to remove power from the associated equipment.

A feature of the present invention resides in the fact that different sensing devices may incorporate different capacity heaters so that the sensing device of the present invention may be utilized with any type of equipment regardless of the current capability of the equipment. That is, if the equipment to be monitored draws a high current, a sensing device having a heater 14 which has a high current capacity may be provided to ensure that the triggering temperature will be reached only when the current of the particular equipment being monitored reaches a dangerous valud. Hence, the present device is extremely flexible for use with various types of equipment.

The enclosure 16 (FIGS. 3 and 4) comprises an open-ended tube 17, preferably of a shiny metal, having a substantially centrally located opening 38 in the peripheral wall thereof. The interior wall of the tube 17 may be coated with a layer 40 of electrically and thermally insulative material such as a silicone or ceramic material to insulate the tube 16 from the electrical components and to reflect the heat from the portion 32 therein.

The heater 14 is received longitudinally within the enclosure 16 with the portion 32 located opposite the opening 38. The sensor 12 extends through the opening 38 transversely to the axis of the tube 17 and the face of the pellet 20 is in juxtaposition to the portion 32 of the heater 14. One face of an electrically insulative slab 42 having a high thermal conductivity, such as mica or asbestos paper, is in intimate engagement with the portion 32 of the heater 14 and the opposite face thereof is in intimate engagement with the face of the pellet 20. Alternatively, a layer of material of the type disclosed in U.S. Pat. No. 3,413,232 may be used. Hence, the heater 14 is maintained in energy exchanging relationship with the sensor 12 but is electrically insulated therefrom. The sensor 12, heater 14 and slab 42 may be maintained in position by an electrically insulative glue of the type disclosed in the aforementioned patent or potting compound (not shown) which may fill the interior of tube. The enclosure 16 serves to reflect and concentrate the heat produced by the portion 16 in a small area.

As shown in FIG. 4, the terminal portions 34 and 36 of the heater 14 extend beyond the ends of the tube 17. Additionally the leads 22 and 24 of the sensor 12 extend through the opening 38. The leads 22, 24 are bent at an angle to the vertical for reasons which will become apparent hereinbelow.

The enclosure 16, with the components therein, is received within the jacket 18. More specifically, the jacket 18, which is fabricated from a thermally and electrically insulative material such as a ceramic or the like, includes a cylindrical section 44 of substantially greater diameter than the enclosure 16. The enclosure is located within the section 44 and is positioned so that the terminal portions 34 and 36 extend beyond the respective ends of the cylindrical section. Ceramic bushings or plugs 46 or 48 seal the open ends of the section 44.

The bushing 46 is provided with a centrally located slot 50 and the bushing 48 is provided with an aligned centrally located slot 52. The slots 50 and 52 receive the respective terminal portions 36 and 34 of the heater 14 therethrough and thereby serve to suspend the enclosure 16 substantially axially within the section 44 and in spaced relation to the walls thereof. The bushings may be connected in place and an appropriate cement may be placed in the slots 50 and 52 to bind the terminals 36 and 34 to the respective bushings 46 and 48 to maintain the enclosure 16 in position. It is to be noted that the air space between the enclosure 16 and the wall of the section 44 and the thermally nonconductive jacket 18 insulate the enclosure from the surroundings so that the sensor 12 is insensitive to external temperature variations.

As noted above, the leads 22 and 24 are bent at an angle so that they fit within the jacket 18. In order to permit connections to the sensor 12, connecting wires 54 and 56 are provided. The wire 54 is connected to the lead 22 and the wire 56 is connected to the lead 24. The wires 54 and 56 extend through apertures 58 and 60, respectively, in the bushing 48 to permit connections to the control circuit. Alternatively, the wires 54 and 56 can be brought out through the cylindrical section 44.

Protective end caps 62 and 64, which may be fabricated from a metal, are provided to protect the ceramic jacket 18 from breakage or cracking. The end caps 62 and 64 are substantially similar in construction and include end walls 66 and peripheral walls 68 which receive the ends of the section 44 therein with the respective end walls in contact with the bushings 46 and 48. The end walls 66 are provided with central aligned bores 70 which have a diameter in excess of the width of the terminal portions 36 and 34 of the heater 14 and through which the terminal portions extend without contacting the end caps. Additionally, the end cap 64 is provided with apertures 72 and 74 (FIG. 5) which are positioned to be in alignment with the respective apertures 58 and 60 and which receive the respective wires 54 and 56 therethrough. The end caps 62 and 64 may be cemented in place.

Accordingly, a thermal sensing device has been disclosed which is highly accurate and efficient in operation and which is not affected by external temperature variations.

While a preferred embodiment of a thermal sensing device constructed according to the invention has been shown and described herein it will become apparent that numerous omissions, changes and additions may be made in such embodiment without departing from the spirit and scope of the present invention.

What is claimed is:

1. A thermal sensing device comprising sensing means having an impedance which varies in accordance with its temperature, temperature varying means for varying the temperature of said sensing means, said temperature varying means having means for connecting said temperature varying means with an external device to be monitored whereby the temperature of said temperature varying means varies in accordance with a selected parameter of the external device, an enclosure receiving said temperature varying means and said sensing means therein with said temperature varying means in energy-exchanging relationship with said sensing means, said sensing means including lead means for connecting said sensing means in a control circuit, and a coating of a material having a low thermal conductivity on the interior wall of said enclosure.

2. A sensing device as in claim 1, and a low thermal conductivity housing receiving said enclosure therein.

3. A sensing device as in claim 1, and, electrical insulating means having a one face in intimate engagement with said temperature varying means, and the opposite face in intimate engagement with said sensing means.

4. A sensing device as in claim 3, in which said electrical insulating means is fabricated from a material having a high thermal conductivity.

5. A sensing device as in claim 1, in which said sensing means has a characteristic such that the impedance of said sensing means changes rapidly at a preselected temperature.

6. A thermal sensing device for use with an external control circuit for controlling the operation of associated equipment comprising sensing means which varies in impedance in accordance with variations in the ambient temperature, said sensing means having leads adapted to be connected to the control circuit, a heater having a heat producing portion in energy-exchanging relationship with said sensing means, said heater having terminals for connection with the associated equipment whereby the temperature of said heater varies in proportion to a parameter of said associated equipment, an enclosure receiving at least the heat producing portion of said heater and said sensing means therein, and an insulating jacket surrounding said enclosure.

7. A thermal sensing device as in claim 6, and an electrically insulating high thermal conductivity material between said heater and said sensing means.

8. A thermal sensing device as in claim 6, in which said jacket comprises a cylindrical section receiving said enclosure therein, said heater terminals extending beyond the ends of said cylindrical section, a bushing on each end of said cylindrical section, said bushings having axial apertures each receiving respective terminal therethrough, whereby said enclosure is substantially axially located within said jacket.

9. A thermal sensing device as in claim 8, in which at least one of said bushings is provided with a through bore which receives the sensing means lead therethrough.

10. A thermal sensing device as in claim 6, and an electrically insulative material covering the interior of said enclosure.

11. A thermal sensing device as in claim 11, in which said enclosure comprises a tube, said heater extending longitudinally through said tube with said heat producing portion received within said tube, said tube having an open portion, and said sensing means extending through said open portion of said tube.

12. A sensing device as in claim 6, in which the impedance of said sensing means changes at a rapid rate when the ambient temperature reaches a preselected cycle.

13. A sensing device as in claim 6, in which the parameter of the associated equipment being monitored is a current produced by said associated equipment, lead means for connecting said heater terminals with said associated equipment, said heat producing portion of said heater having a smaller cross-sectional area than said terminals whereby the heat produced by said heater is concentrated in said heat producing portion.